Patented Feb. 14, 1939

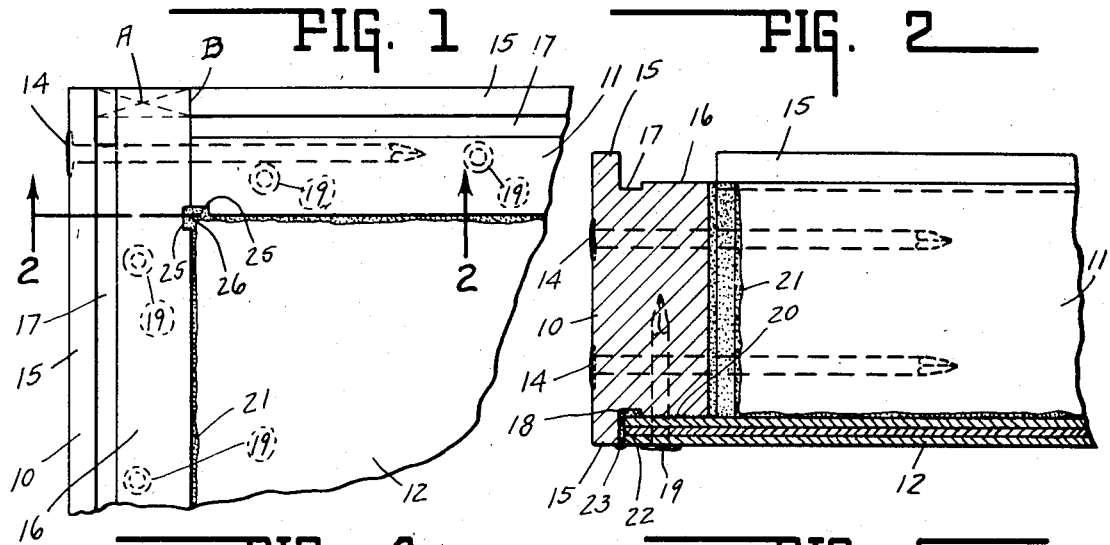
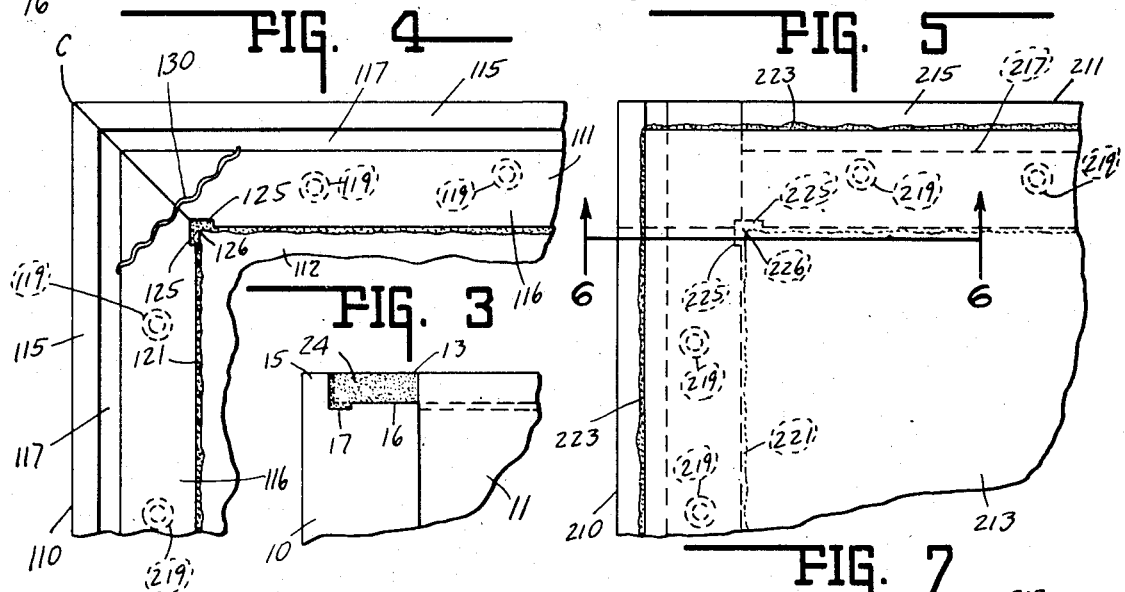
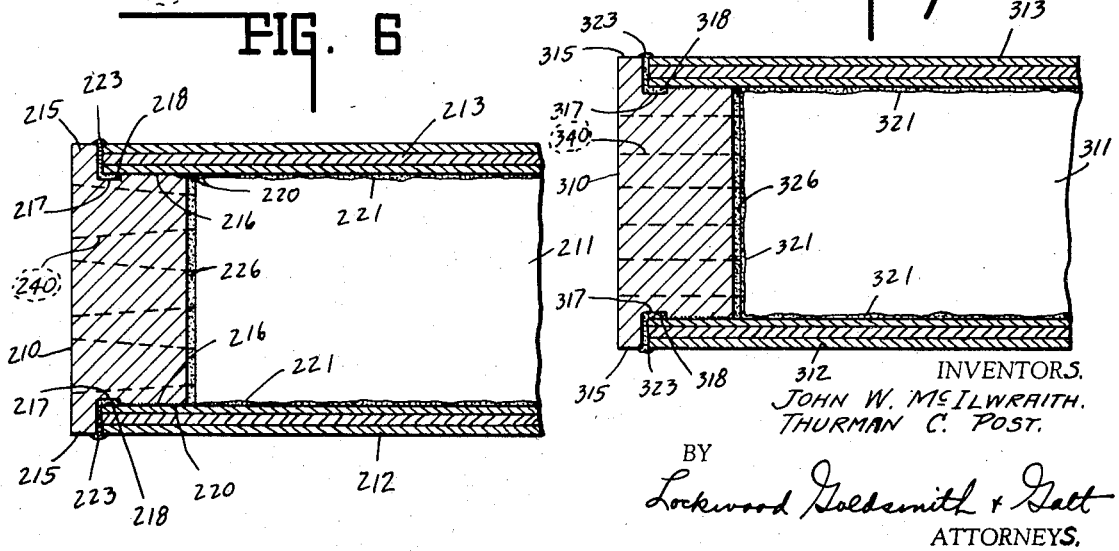

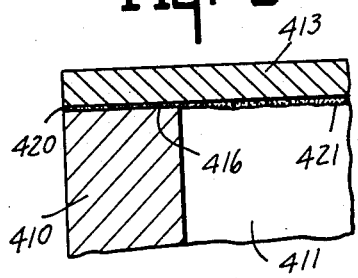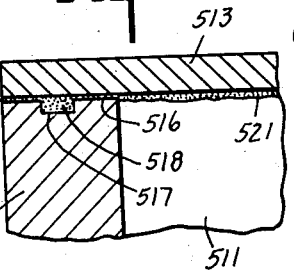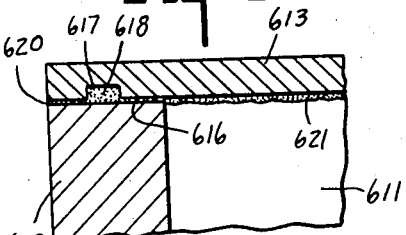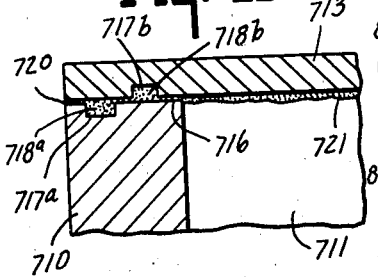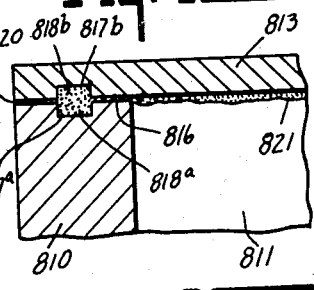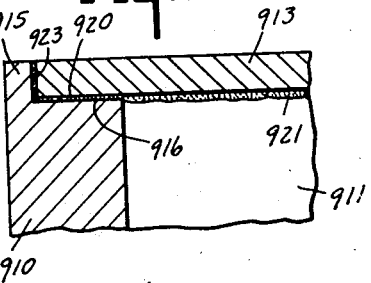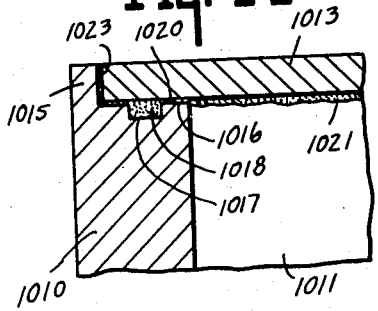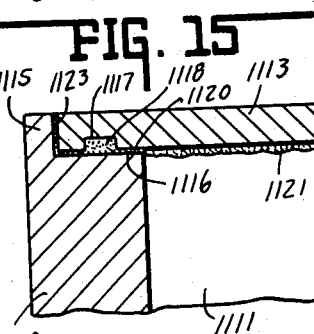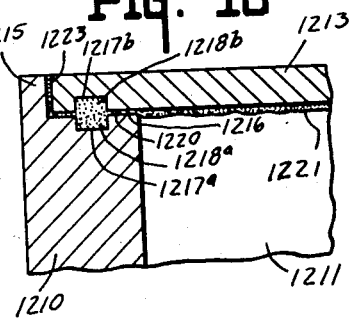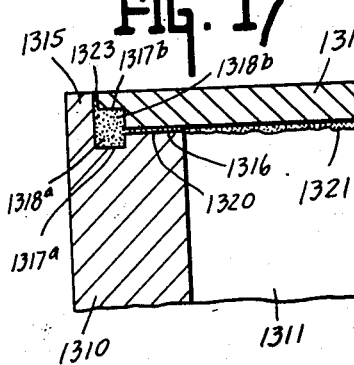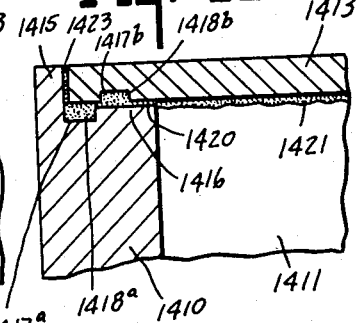

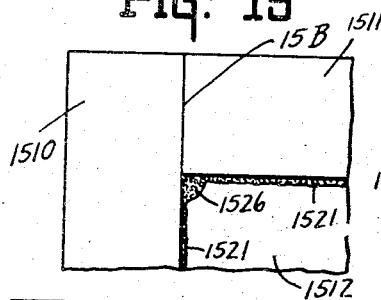
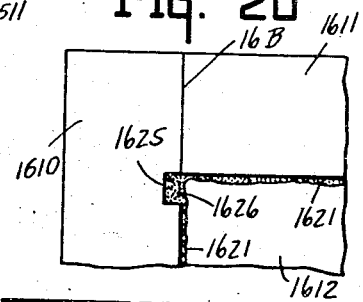
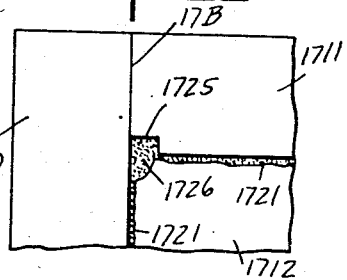
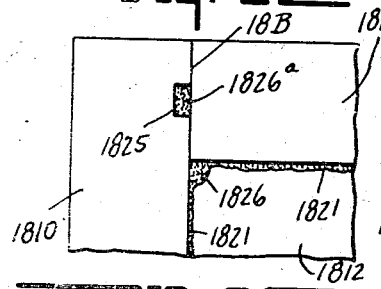
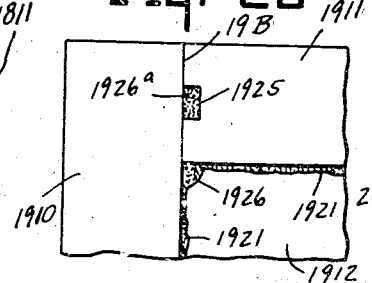
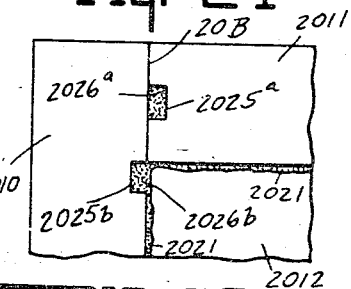
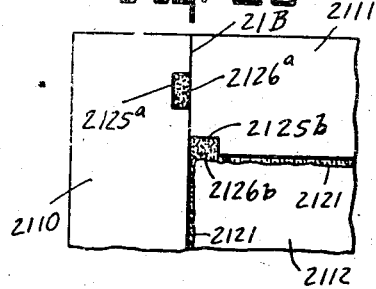
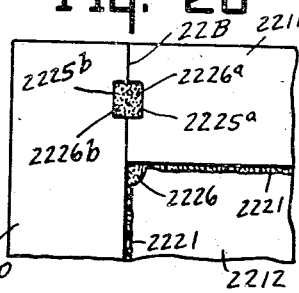
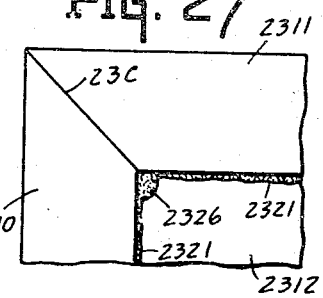
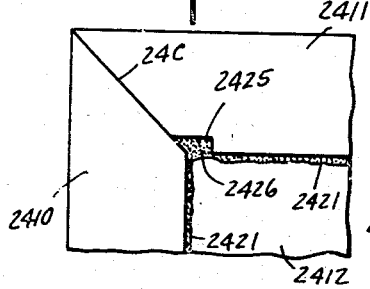
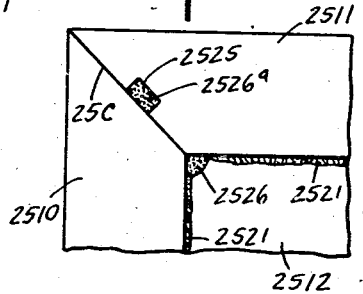
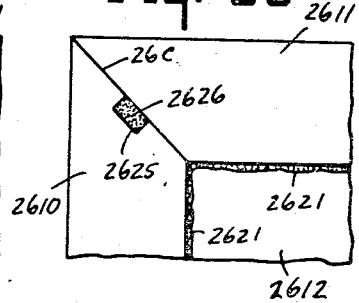
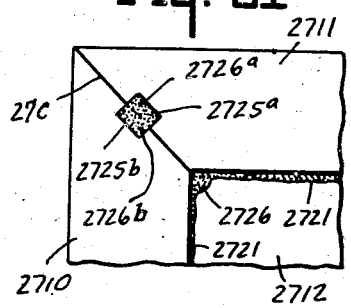
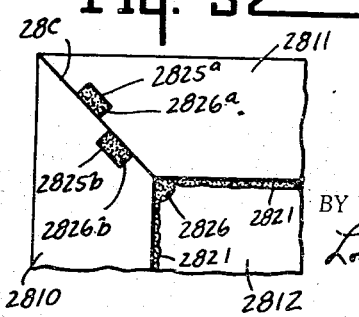

2,146,971

UNITED STATES PATENT OFFICE 2,146,971

SEALED CONTAINER STRUCTURE

John W. McIlwraith and Thurman C. Post, New Castle, Pa., assignors to Associated Box Corporation, New Castle, Pa., a corporation Application August 7, 1936, Serial No. 94,746

2 Claims. (Cl. 217—5)

This invention relates to a moisture-proof shipping container which is adapted peculiarly for the export shipment of tin plate, although not necessarily restricted thereto.

Heretofore in this industry, some export shipments of tin plate have been of the following type. The several plates of substantially the same size are wrapped in oiled paper, or the like, and then placed in a sealed container of tin plate, or the like, the same having soldered or like connections, which seals the sheets within the container. Then the sealed envelope is packaged in a wooden container, the interior dimensions of the same corresponding substantially to the exterior dimensions of the sealed envelope. The reason for this procedure, and it is not necessarily restricted to the shipment of tin plate but applies to other articles as well, is that material of this character during shipment may be subjected to wide temperature variations. The temperature of the freight car may be 10° or 20° below zero Fahrenheit, as was encountered during the winter of 1935 and 1936. In the hold of the ship, the temperature may vary from 50° to 70°, usually being in the neighborhood of 60°. When the ship is in the tropics, the temperature in the hold may rise to 110° to 120° F. As the ship proceeds southward, the temperature again will fall.

All air, unless dehydrated, contains a certain percentage of moisture. Since changes of temperature result in air travel, if a package is not air tight, the air will pass into and out of the package with temperature changes. This results in condensation forming within the package. In the case of tin plate, for example, this condensation results in rusting of the plate, destroying its usefulness for certain purposes, particularly the manufacture of tin cans and other sanitary containers for food products.

A relatively small box and its contents of tin plate will weigh in the neighborhood of 200 lbs. Tin plate is sold on a box basis, fifty six sheets to the box unit. With medium size sheets, it is customary to ship 112 sheets to the package or on a two box basis. With smaller sheets, 224, or a four box basis, are used, et cetera. When it is remembered that the material in these boxes weighs 200 lbs. or so, it is quite apparent the box must have sufficient inherent strength and rigidity to take care of this weight. The major strength of the box is in the sides and ends or rail formation.

The chief object of the present invention is to provide a moisture proof box by providing a box structure which has all of its joints suitably sealed against air passage.

The invention hereinafter set forth, has been tested by applying air pressure internally thereto, until the top and bottom of the box bulged outwardly and yet there was no leakage when the bulged box was immersed in water. Also, a box embodying one form of the invention with top removed was half filled with water and permitted to stand for more than five days and there resulted no leakage through the connections or joints.

In the first or inflation test, boxes made with three-ply laminated wood closures and boxes made with solid fibre board closures were used.

The flotation test last mentioned, wherein a container held water for more than five days, was made with a container having a ply wood bottom. Whichever solid fibre or ply wood board is utilized, there is present the tendency that capillary attraction will permit the exposed edges to absorb the moisture and transmit it through the material.

Various materials have been utilized as a sealing medium but the best commercial medium available, having due regard for cost and the purpose for which it is intended, has been found to be a latex solution or compound, preferably in form having a consistency about like tooth paste or shaving cream. When in this physical condition, the material may be readily handled through the use of a pressure supply, nozzle directed and manually controlled device, although for "line" production, as it is called, it is entirely feasible to have such a supply device automatically controlled.

Various embodiments of the invention are hereinafter illustrated and described. The illustrations, however, all are directed to one corner of a box or container embodying the invention. It is to be understood that the box may be of any form required or desired, that is, having not less than three sides and a top and/or a bottom. The invention, therefore, is not to be restricted to a so-called flat top box, although that form is illustrated.

As previously stated, various sealing means have been employed but certain of these media, for example, tar, imparts to the plate an odor or taste, or the like which, when the plate is made into cans, is transmitted to the food therein. This, of course, in these instances, renders the use of tar highly objectionable.

Rosin is another sealing constituent which has been employed but which has the objection that when subjected to certain conditions, such as extreme shock when a handler drops the package, the rosin may shatter or break at the point of strain. This permits the access of air. However, in certain instances, the use of rosin is satisfactory. Asphalts or asphaltic compositions in certain circumstances may be satisfactory.

As previously stated, the best sealing medium and one which does not fracture or shatter when subjected to shock and which does not impart an odor or taste to the plate, is the latex solution, before mentioned. This does have the property, when utilized, of making the joints of the container air tight and, therefore, moisture proof.

Other objects and features will appear more fully hereinafter in the detailed description of the various forms of the invention.

The full nature of the invention will be understood from the accompanying drawings and the following description and claims:

In the drawings,

Fig. 1 is a top plan view of one corner of the invention embodied in a rectangularly outlined box, the cover being omitted.

Fig. 2 is a vertical sectional view taken on line 2—2 of Fig. 1 and in the direction of the arrows.

Fig. 3 is an end or side view of an upper corner of such a box.

Fig. 4 is a view similar to Fig. 1 and of a modified form of the invention, Figs. 1 to 3 illustrating a butt joint rail connection, while Fig. 4 illustrates a mitred joint rail connection.

Fig. 5 is a top plan view of a corner of a box embodying another form of the invention, the top or cover being in place and the rail connection being of the tongue and groove character.

Fig. 6 is a vertical sectional view taken on line 6—6 of Fig. 5 and in the direction of the arrows, and illustrates the parts of the box shown therein, the rails having a dove-tail tongue and groove connection.

Fig. 7 is a view similar to Fig. 6 and of a modified form of the invention, the tongue and groove rail connection being of flat character, as distinguished from the wedge or dove-tail character, illustrated in Fig. 6.

Figs. 8 to 12, inclusive, are vertical sectional views of various modified forms of the invention, embodying a plane faced closure and rail contact.

Figs. 13 to 18, inclusive, are similar views of additional modified forms of the invention embodying the rail nested closure form of the invention.

Figs. 19 to 26, inclusive, are top plan views of a corner of a butt joint rail construction embodying modified forms of the invention.

Figs. 27 to 32, inclusive, are similar views of a mitred joint rail connection embodying modified forms of the invention.

In Figs. 1 to 3 of the drawings, 10 indicates one rail or side of a box, 11 an immediate adjacent rail or side of the box, 12 a bottom and 13 the top. The rails are shown having a butt joint relationship and are secured suitably together as by a plurality of nails 14.

In one preferred form of the invention, each rail is provided with a ridge 15 positioned remote from the container interior and immediately adjacent said ridge and in the seat 16 is a groove 17, the same being coextensive with the rail. The ridge also is coextensive with the rail, since this type of structure readily lends itself to economical production by wood working machines.

Herein the bottom—and the top is of similar character—is illustrated as of three-ply laminated wood and it is understood that the outline thereof corresponds to the outline of the well or seating socket or recess arrangement formed by the seats 16 and ridges 15.

After the rails are assembled, the sealing composition, before mentioned and indicated by the numeral 18, is applied to the face of the seat 16 and more especially in the groove 17. Then the bottom is applied to the rails and is secured suitably thereto as at 19. In this operation, the surplus sealing composition is extruded in two transverse directions, forming the thin film 20 between the bottom and the seat and a part of it may be squeezed into the container, as indicated at 21 in Fig. 1. Another portion of the material is squeezed transversely between the ridge or guard 15 and the edge 22 of the bottom 12, said portion being indicated by the numeral 23.

It is apparent that not only is the joint between the rail or side and the bottom sealed and made air and water-tight, but the exposed peripheral edge of the bottom also, is sealed. Sufficient sealing material also is applied to the seat, et cetera, so that the space represented by the crossed lines in Fig. 1 near the upper left hand corner and designed by the letter A,—this being the space between the two adjacent ridges 15 in immediate adjacent rails—is filled with sealing composition, as indicated at 24 in Fig. 3 so that the exposed edge of the top or bottom, as the case may be, at the point A, also is sealed to prevent the capillary action before mentioned.

This form of the invention also illustrates each rail being provided with a recess or groove 25, the two grooves registering at the vertical inner edge or corner of the container and between two adjacent rails. The composition 26 in both grooves seals the butt joint B against the passage of air,—see Fig. 1.

The tin plate may be wrapped in oil paper, or the like, and then placed in the open box, previously described, and then the cover 13 is applied and nailed down after the groove and seat have been supplied with a sufficient amount of sealing composition. In the event there is an insufficient amount of composition supplied to seal the top, as indicated at A in Fig. 1, additional sealing composition 24—see Fig. 3—is applied to this small recess formed between the two rails or side and end and the top and at each corner.

If, as and when desired, other types of sheet board may be utilized for the top and bottom, in place of the laminated structure illustrated, which is the conventional form of ply wood having a waterproof glue connection between the plies. This glue may be of casein character.

In Fig. 4 a modified form of the invention is illustrated, and in this figure, similar numerals of the one hundred series indicate like or similar parts. 112 indicates the bottom, 110 and 111 adjacent rails, 125 registering recesses receiving the sealing composition 126 at the vertical edge between the rails and upon the interior of the box. 121 indicates the sealing composition extruded when the bottom has been nailed to the rails. 117 indicates the groove in each rail side or end, 115 the ridge portion of each rail and 116 the seat portion of each rail. In this form of the invention, the joint is of mitre character and is indicated by the letter C. 130 indicates a corrugated connector between adjacent rails and utilized when desired.

In this form of the invention, the ridge structure is of full peripheral character and the space A, indicated in Fig. 1, is not present. Likewise, the groove arrangement 115 is of full peripheral character. This is slightly different from the groove arrangement shown in Fig. 1, which is of interrupted character. As shown in Fig. 1, the seat arrangement 116 is of full peripheral character relative to the opening.

If the weight of the contents of the box is such that the connector 130 is insufficient, the nailing arrangement, shown in Figs. 1 and 2, may be utilized in addition thereto, or if desired, such nailing arrangement may be utilized exclusively and the connectors 130 at each corner and upon each side of the rails may be omitted. These connections are well known expedients in the art.

In Figs. 5 and 6, a modified form of the invention is illustrated and in said figures, numerals of the two hundred series indicate like or similar parts. This form of the invention is similar to that shown in Fig. 4, in that the ridge arrangement 215 is of continuous peripheral character and the groove 217 likewise is of continuous character.

This form of the invention, however, differs in that each end of each rail side or end, is provided with a tongue and groove arrangement and of wedge or dovetail character, as indicated by the numeral 240. Wood working machines expeditiously form these complementary end structures. The ends are associated together and are usually secured in that relationship by glue, not shown. Preferably this glue would be of waterproof character.

After the rails (sides and ends) are associated together, composition is applied to the seat and groove on one side of the rails and one of the closures is nailed thereto in substantially the same manner as illustrated in Figs. 1 and 2. This causes the extrusions 221 and 223.

If desired, previous to the assembling of the rails (sides and ends) into peripheral outline arrangement, vertical grooves or recesses, when desired, may be included in the rails immediately adjacent the subsequently formed inside vertical corner. When so included, they are filled with sealing material 226—see Fig. 5—26, see Fig. 1, and 126, see Fig. 4. If a waterproof glue is used in the complementary tongue and groove connections, it may be unnecessary to utilize this last mentioned vertical corner sealing arrangement. In this form of the invention, the nailing arrangement, shown in Figs. 1 and 2, and/or the corrugated connectors, may be utilized when desired. However, usually the same would be required.

In Fig. 7 there is illustrated a modified form of the invention similar to that illustrated in Figs. 5 and 6. Numerals of the three hundred series in Fig. 7 indicate like or similar parts. However, this form of the invention differs from that shown in Figs. 5 and 6, in that the complementary wedge or dove-tail connections at the joints between the rails are of regular or square character, which also is customary in box manufacture.

In Fig. 8 of the drawings, there is illustrated a seal closure construction for the container and embodying the invention. This form of the invention is characterized by the closure, for example, 413, having a plane face contact with the rails 410 and 411, although separated by the sealing means 420 applied to the face 416 of the rail, the excess being interiorly exposed as at 421.

Fig. 9 is a similar view of a modified form of the invention wherein, as in Fig. 8, the closure laps the rails to the full extent of the outer outline thereof. In this figure numerals of the five hundred series, similar to those previously employed, designate like or similar parts. This form of the invention is distinguished from that shown in Fig. 8 in that the rails, and herein for clearness rail 510, is shown provided with a longitudinal groove 517 in the face 516, and this groove receives the sealing means 518. In all other respects, this form of the invention is similar to that illustrated in Fig. 8.

In Fig. 10, numerals of the six hundred series are employed. This form of the invention may be considered a reversal of the form shown in Fig. 9, in that the groove 617 is formed in the closure 613 and, of course, receives the sealing means 618.

Fig. 11 is a modification of the forms of the invention shown in Figs. 9 and 10, and numerals of the seven hundred series indicate like parts. In this form of the invention, subscripts "a" and "b" are employed with certain numerals—to-wit, the groove in the rail is indicated by 717a, sealing means therein by 718a and the groove in the closure is indicated by 717b and the sealing means therein by 718b.

In Fig. 12 a modified form of the invention is illustrated similar to Fig. 11 and the parts are similarly designated by numerals of the eight hundred series, but in this form of the invention, the two grooves in the rail and the cover register with each other.

Fig. 13 illustrates a modified form of the invention similar to the form illustrated in Figs. 6 and 7, in that one or both rails 910 and 911 are provided with a ridge 915 and the closure 913 is nestingly associated therewith. In this form of the invention, numerals of the nine hundred series indicate similar or like parts. For example, on the supporting face 916 of the rail 910 is the sealing means 920, the numeral 921 indicating the interior extruded portion thereof and 923 indicating the seal for the edge of the closure.

Fig. 14 is a view similar to Fig. 13, and numerals of the ten hundred series indicate similar or like parts but this form of the invention differs from that shown in Fig. 13 in that the face 1016 is provided with a groove 1017 and the groove is offset relative to the ridge portion 1015. The groove accommodates the sealing means 1018.

Fig. 15 is a view similar to Fig. 14 and of what may be termed a reverse form of the invention. In this form of the invention, the groove 1117 is shown positioned remote from the edge of the closure 1113 and in the rail overlying portion of said closure. It receives the sealing means 1118. Numerals of the eleven hundred series indicate like or similar parts in this figure.

In Fig. 16 there is illustrated a modified form of the invention which, in brief, not only includes both forms of the invention shown in Figs. 14 and 15, but the additional fea'ure that the two grooves 1217a and 1217b register with each other, and each receives sealing means 1218a and 1218b, respectively. Numerals of the twelve hundred series indicate like or similar parts herein.

In Fig. 17 there is illustrated a modified form of the inven'ion shown in Fig. 16 and somewhat comparable to the form of the invention shown in Figs. 6 and 7, in that in the first instance, there are registering grooves in the rail and closure and in the second instance, the groove in the closure is positioned immediately adjacent the edge of portion 1313. Numerals of the thirteen hundred series indicate like or similar parts.

Fig. 18 illustrates a modification of the forms of the invention illustrated in Figs. 14 to 17, inclusive, in that in this form the rail groove 1417a is positioned immediately adjacent the portion 1415 and the closure groove 1417b is positioned in offset relation to the rail groove. Each of these grooves receives sealing means 1418a and 1418b, respectively. Numerals of the fourteen hundred series indicate like or similar parts in this figure.

Figs. 19 to 26, inclusive, relate to and illustrate modified forms of a butt joint connection between the rails in the container in which the invention is embodied.

In Fig. 19 numerals of the fifteen series indicate like or similar parts and similarly in Figs. 20 to 26, inclusive, numerals of the sixteen hundred to twenty two hundred series, respectively, indicate like or similar parts, with this exception, that in Figs. 19 to 26, inclusive, the letter "B", prefixed by the appropriate number of the hundred series numerals used in said figure, designates the butt joint.

In Fig. 19, the corner seal is indicated by the numeral 1526. 1521 indicates the surplus seal extruded in the mounting of the closure on the rails. This is the simplest form of butt joint invention sealing arrangement.

In Fig. 20, the butt joint 16B between the rails 1610 and 1611, respectively, is sealed as at 1626, the seal 1626 being positioned in the groove 1625, herein shown formed remote from the end of the rail and at the interior corner.

In Fig. 21 the groove 1725 is shown at the end of the rail and at the interior corner and the seal 1726 therein seals the butt joint 17B.

Fig. 22 is similar to Fig. 19 but in addition thereto, illustrates a groove 1825 provided in one rail between the interior corner and the end of the rail, and said groove receives the sealing means 1826a. 18B indicates the butt joint between the rails.

Fig. 23 illustrates a reverse form of the invention in that the groove 1925 is positioned in the opposite rail member from that illustrated in Fig. 22 and thus is positioned in the end of rail 1911 and offset from the interior corner, the latter being sealed as at 1926, the groove 1925 receiving the seal 1926a.

Fig. 24 illustrates the form of the invention similar to that illustrated in Fig. 20 and Fig. 23. In this form, groove 2025b is remote from the end of one rail and at the interior corner and groove 2025a is in the end of the rail and offset from the interior corner. Each receives the sealing means 2026b and 2026a, respectively, and thus a dual seal is provided for the butt joint 20B.

In Fig. 25 there is illustrated a reverse form of the invention shown in Fig. 24 and this form of the invention is a modification or combination, as it were, of the forms of the invention shown in Figs. 21 and 22 to the extent that one rail, remote from the end thereof and offset from the interior corner, includes groove 2125a receiving the sealing means 2126a and the other rail at the corner, and in and at the end of the rail is provided with a groove 2125b which receives the sealing means 2126b. This form of the invention provides a dual seal for the butt joint 21B.

In Fig. 26 there is illustrated a form of the invention which is of dual seal character and which is similar to the form of the invention shown in Fig. 1 in that the grooves in adjacent rails register. However, it differs therefrom as stated, by including a dual seal and the registering groove arrangement instead of registering with the interior corner, is offset therefrom. In this figure, 2225 indicates the interior corner seal, 2225b a groove in one rail remote from the end and in the corner, 2225a a groove in the end of the adjacent rail and remote from the corner, the two grooves registering and receiving the sealing means 2226b and 2226a, respectively.

It is to be understood that in those forms of the invention wherein a dual seal is illustrated, that the corner seal may be omitted whenever desired.

In much the same manner that Figs. 19 to 26, inclusive, illustrate modified forms of a butt joint sealing connection, Figs. 27 to 32, inclusive, illustrate modifications of the mitred joint sealing connection. In said figures, numerals of the twenty three hundred series to the twenty eight hundred series, respectively, designate like or similar parts in Figs. 27 to 32, respectively. Also, in said figures, the letter "C" preceded by the numeral designating the appropriate hundred series of the numerals utilized, designates the mitre joint in the respective figures.

Fig. 27, as stated, is similar to Fig. 4 in that it illustrates a mitre joint form of the invention and herein the corner seal 2326 is positioned at the corner between the mitred ends of the rails and there is no groove in either or both rails, so that the joint 23C is sealed suitably.

Fig. 28 illustrates a simplification of the form of the invention shown in Fig. 4 to the extent that but one rail has but one groove 2425 that receives the sealing composition 2426 for sealing the mitre joint 24C, the other rail differing from the showing in Fig. 4 by having no groove therein.

In Fig. 29 there is illustrated a form of the invention which is a combination of that illustrated in Figs. 27 and 28 but in this form, the groove 2525 instead of being positioned at the interior corner of the mitre joint, is positioned intermediate the ends of the mitre face of one rail. This groove receives the sealing means 2526a and this form of the invention differs from all previous forms illustrated with respect to the mitre joint seal arrangement by providing a multiple or dual seal, 2526 indicating the corner seal.

In Fig. 30 there is illustrated a form of the invention similar to Fig. 28, except that the groove 2625 in the one rail is not positioned at the interior corner but is offset therefrom and between the ends of the mitred face of the rail. The joint 26C is sealed by the sealing means 2626.

In Fig. 31 there is illustrated a form of the invention similar to that illustrated in Fig. 4, in that the mitred rails have registering grooves but differs therefrom in that the groove arrangement is positioned remote from the interior corner. In this form of the invention, if, as and when desired, the interior corner may be provided with the sealing means 2726. The registering grooves are designated 2725a and 2725b and the sealing means therein are designated 2726a and 2726b respectively providing a second seal for the joint 27C.

In Fig. 32 there is illustrated a form of the invention similar to that shown in Fig. 31, except that the several grooves in the mitred faces of the rails do not register. Each of these grooves 2825a and 2825b receives the sealing means 2826a and 2826b, respectively, for sealing the mitre joint 28C. If, as and when desired, there may also be added a seal 2826 at the interior corner. Thus a multiple seal arrangement is provided.

It is to be understood that any one of the closure sealing arrangements of the lapping or nested type may be associated with any one of the butt joint or mitre joint sealing arrangements of singular, dual or plural character.

While the invention has been described in great detail in the foregoing description and various modifications thereof have been referred to herein as well as others which have been illustrated, such detailed description and illustration is to be considered illustrative and not restrictive in character. Such modifications, as well as others which will readily suggest themselves to persons skilled in this art, are all considered to be within the broad scope of this invention, reference being had to the appended claims.

The invention claimed is:—

1. In a box structure for packaging tin plate or the like, a series of relatively broad but shallow rails secured together end to end to form a frame comprising the sides and ends of the box, said rails having grooves in their upper and lower faces coextensive with and longitudinally of said rails and remote from the inner edges thereof, top and bottom covers for said frame formed of material impervious to moisture, said covers having smooth and substantially flat marginal edges overlapping the said grooves and resting upon said rails, semi-plastic latex sealing means squeezed in each of said grooves and upon those surfaces of said rails contacted by said covers; and means for securing said covers tightly upon said rails.

2. In a box structure for packaging tin plate or the like, a series of relatively broad but shallow rails secured together end to end to form a frame comprising the sides and ends of the box, said rails having grooves in their upper and lower faces coextensive with and longitudinally of said rails and remote from the inner edges thereof, top and bottom covers for said frame formed of material impervious to moisture, said covers having smooth and substantially flat marginal edges overlapping the said grooves and resting upon said rails, semi-plastic latex sealing means squeezed in each of said grooves and upon those surfaces of said rails contacted by said covers, semi-plastic latex sealing means extending the entire depth of said rails at their intersection with one another to seal the joints thereof, and means for securing said covers tightly upon said rails.

JOHN W. McILWRAITH.
THURMAN C. POST.